United States Patent Office

3,492,212
Patented Jan. 27, 1970

3,492,212
ULTRASONIC TREATMENT OF PROTEIN MATERIALS
Ronald L. Searcy, Upper Montclair, N.J., assignor to Hoffmann-La Roche Inc., Nutley, N.J., a corporation of New Jersey
No Drawing. Filed Dec. 1, 1966, Ser. No. 598,150
Int. Cl. B01j 1/12
U.S. Cl. 204—160.1   12 Claims

ABSTRACT OF THE DISCLOSURE

Novel blood protein complexes are formed by treating individual blood serum fractions, mixtures of said fractions, and lipids in combination with said individual fraction or mixtures thereof with ultrasonic vibrations.

---

This invention relates to methods of modifying blood protein materials, forming lipid containing complexes with said proteins, and the products produced thereby. More particularly, this invention relates to a method of treating individual blood serum fractions, mixtures of said fractions, and lipids in combination with said individual fraction or mixtures thereof with ultrasonic vibrations, thereby providing novel blood protein complexes.

Normal blood serum contains five electrophoretically separable protein fractions, i.e., γ-globulin, β-globulin, $\alpha_2$-globulin, $\alpha_1$-globulin and albumin. This is demonstrated by electrophoresis on paper or cellulose acetate medium which indicates that the largest protein fraction of normal blood serum is albumin and the second largest protein fraction is γ-globulin. Electrophoresis is a conventional method of analyzing the relative proportions of proteins in blood serum and measures the anodal of cathodal migration of the various proteins. This is done by putting a drop of the serum or protein fraction on an electrophoretic filter paper and exposing it to constant electric current, e.g., 2.5 milliamps for 16 hrs. At the end of this time, the paper is dyed with a measured amount of bromophenol blue or Ponceau S. The dye pattern discloses the relative amounts of each of the proteins present in the serum and the degree of migration of each protein fraction. If only one protein fraction is present, an electrophoretic pattern is established for that fraction. This pattern is unique for each blood protein fraction under the conditions of the test in that it defines the degree of anodal or cathodal migration of the protein. It is known that the albumin fraction of serum displays the fastest degree of anodal migration and the γ-globulin fraction displays the slowest anodal migration and is cathodally oriented. This is shown wherein a mixture of γ-globulin and albumin and are subjected to electrophoresis. The resulting pattern shows that relative to the point of specimen application, a large concentration of protein appears at the cathodal portion of the electrophoretic paper, i.e., γ-globulin, and a large concentration appears at the anodal portion of the electrophoretic paper, i.e., albumin. These areas are called, respectively, the γ-globulin zone and the albumin zone. Any modification or change in the protein structure or composition alters the electric charge of the protein and is manifested by an alteration of the electrophoretic pattern.

By means of the process of this invention, the serum proteins of blood are modified to produce novel protein structures and compositions which are manifested by altered electrophoretic patterns, e.g., when albumin is exposed to ultrasonic radiation, the structure is altered as manifested by its electrophoretic pattern which is changed so that the peak in the albumin zone is reduced and a new peak adjacent to it and displaced toward the cathode is formed, when γ-globulin is exposed to ultrasonic radiation, the structure is altered as manifested by its electrophoretic pattern which is changed so that the peak in the γ-globulin zone is reduced and a new peak adjacent to it and displaced toward the anode is formed. When a mixture of albumin and γ-globulin are exposed to ultrasonic radiation, the structure of the mixture is altered as manifested by its electrophoretic pattern which is changed so that it resembles the pattern of ultrasonically treated γ-globulin and contains a peak in the albumin zone. The albumin peak, however, is somewhat smaller than would be expected from the amount of albumin present because, apparently, a complex between a portion of albumin and a portion of γ-globulin is formed which retains the electrophoretic properties of the ultrasonically formed γ-globulin fraction. The resulting novel proteins are characterized by their electrophoretic behavior and can be further characterized by turbidity and salting out procedures hereinafter discussed.

These novel protein materials are useful for supplying protein nutrients orally to patients with malfunctions of the digestive system. Lipase acts upon an ultrasonically treated mixture of lipid and albumin more readily than upon the same mixture prior to treatment. The process of this invention also provides a method of modifying the titers of antiserum and altering antigenic properties of human plasma protein containing the novel products. The modified proteins are also useful as bacteria culture media by supplying protein nutrients in a more readily utilizable form.

In another aspect of this invention, complexes are formed between lipids or β-lipoproteins and γ-globulin, albumin or mixtures thereof by treatment thereof with ultrasonic radiation. When β-lipoproteins are subjected to ultrasonic radiation, the material is transformed into a mixture of lipids and proteins, having the appearance of chylomicrons, i.e., hydrophobic fat particles in the blood which are usually present in the human blood for a time after ingestion of food containing lipids. Mixtures of lipids or β-lipoproteins with albumin are turbid. Subjection of the mixture to ultrasonic radiation changes the electrophoretic pattern of the mixture so that the peak in the albumin zone is reduced and a new peak adjacent to and displaced toward the cathode is formed. This indicates that a complex protein containing both β-lipoprotein and albumin is formed. The turbidity of the mixture is greatly diminished, an indication that it is more water soluble and can thus be utilized to supply protein and fat nutrients to subjects with malfunctions of the digestive system by means of intravenous injection, or, orally. Mixtures of lipids or β-lipoproteins with γ-globulin are turbid. Subjection of this turbid mixture to ultrasonic radiation causes the turbidity to disappear indicating that the lipid containing fraction is water solubilized. Electrophoretic analysis of the treated mixture shows that a new peak is formed adjacent to the γ-globulin zone and displaced toward the anode. The γ-globulin peak reduced in intensity. This indicates that a complex is formed between the lipid containing fraction and the γ-globulin. These complexes are useful for providing protein and fat nutrients to patients with a digestive malfunction, either orally, or, by intravenous injection. Similarly, a mixture of albumin, γ-globulin and β-lipoproteins or lipids is turbid. Upon exposure of the mixture to ultrasonic radiation, the turbidity disappears indicating that it has been water solubilized. When electrophoretically analyzed, the peaks in the albumin zone and γ-globulin zone are reduced and a new peak adjacent to the γ-globulin zone and displaced toward the anode is present. This indicates formation of a complex lipid-protein of altered structure.

The process of this invention is carried out by subjecting the isolated serum protein fractions, e.g., albumin, γ-globulin or mixtures thereof either alone or in mixtures with β-lipoproteins or lipids to sound frequencies in the ultrasonic ranges. This is done by inserting a probe which is connected to an ultrasonic frequency-producing apparatus into a container of the material being treated and vibrating the probe at ultrasonic frequencies. A suitable apparatus is the MSE Ultrasonic Disintegrator (Instrumentation Associates, Inc., New York) which produces sound frequencies of up to 18 to 20 kilocycles per second. Application of that sound frequency for about 10 minutes produces the modified complexes of this invention.

The degree of molecular rearrangement which is caused by ultrasonic radiation is a function of time and sound frequency. However, this invention is not limited to any specific sound frequency so long as it is within the ultrasonic range. The time factor is important only in that treatment for sufficient time to achieve the desired effects is required. For convenience, the apparatus utilized in the process of this invention produces sound frequencies which will produce the desired effects within an economical time period, e.g., about 10 minutes. Therefore, in the examples and results which follow, all characterization of products is made wherein sound frequencies of 18 to 20 kilocycles per second were applied for about 10 minutes. However, other time and frequency combinations are equally suitable in producing the compounds of this invention.

EXAMPLE 1

A 4 ml. volume of solution containing purified human serum albumin (6.25 gram percent) was put in a heat resistant tube and placed in an ice-water bath. A titanium probe 0.75 inch in diameter with an end ratio of 3.6 to 1 was immersed in 1 to 2 ml. below the surface of the protein solution. Sound frequencies of about 20 kilocycles per second were then generated in the mixture by means of an MSE Ultrasonic Disintegrator for 10 minutes. The protein solution, when treated in this manner, remains several degrees below room temperature throughout the period of treatment. The product was recovered and characterized by electrophoresis. The results are shown in Table I.

EXAMPLE 2

A 4.0 ml. volume of solution containing purified human serum γ-globulin, (0.7 gram percent) was put in a heat resistant tube and then placed in an ice-water bath. A titanium probe 0.75 inch in diameter with an end ratio of 3.6 to 1 was immersed 1 to 2 millimeters below the the surface of the protein solution. Sound frequencies of about 20 kilocycles per second were then generated in the mixture by means of an MSE Ultrasonic Disintegrator for 10 minutes. The protein solution, when treated in this manner, remains several degrees below room temperature throughout the period of treatment. The product was recovered and characterized by electrophoresis. The results are shown in Table I.

EXAMPLE 3

A 4.0 milliliter volume of solution containing purified human serum albumin (6.25 gram percent) and purified human serum γ-globulin (0.7 gram percent) was put in a heat-resistant tube and then placed in an ice-water bath. A titanium probe 0.75 inch in diameter with an end ratio of 3.6 to 1 was immersed 1 to 2 millimeters below the surface of the protein solution. Sound frequencies of about 20 kilocycles per second were then generated in the mixture by means of an MSE Ultrasonic Disintegrator for 10 minutes. The protein solution, when treated in this manner, remained several degrees below room temperature throughout the period of treatment. The product was recovered and characterized by electrophoresis. The results are shown in Table I.

EXAMPLE 4

A 4 milliliter volume of a mixture containing purified human serum albumin (6.25 gram percent) and 0.2 ml. of a concentrated β-lipoprotein solution was put in a heat-resistant tube and then placed in an ice-water bath. This mixture was turbid. A titanium probe, 0.75 inch in diameter with an end ratio of 3.6 to 1 was immersed 1 to 2 millimeters below the surface of the protein, lipid mixture. Sound frequencies of about 20 kilocycles per second were then generated in the mixture by means of an MSE Ultrasonic Disintgrator for 10 minutes. The protein, lipid mixture, when treated in this manner, became clear and remained several degrees below room temperature throughout the period of treatment. The product was recovered and characterized by electrophoresis. The results are shown in Table I.

EXAMPLE 5

A 4 milliliter volume of a mixture containing purified human serum γ-globulin (0.7 gram percent) and 0.2 ml. of a concentrated β-lipoprotein solution was put in a heat-resistant tube and then placed in an ice-water bath. This mixture was turbid. A titanium probe, 0.75 inch in diameter with an end ratio of 3.6 to 1 was immersed 1 to 2 millimeters below the surface of the protein lipid mixture. Sound frequencies of about 20 kilocycles per second were then generated in the mixture by means of an MSE Ultrasonic Disintegrator for 10 minutes. The mixture, which became clear, when treated in this manner, remained several degrees below room temperature throughout the period of treatment. The product was recovered and characterized by electrophoresis. The results are shown in Table I.

EXAMPLE 6

A 4 milliliter volume of a mixture containing purified human serum albumin (6.25 gram percent) and purified human serum γ-globulin (0.7 gram percent) and 0.2 ml. of concentrated β-lipoprotein solution was put in a heat-resistant tube and then placed in an ice-water bath. This mixture was turbid. A titanium probe 0.75 inch in diameter with an end ratio of 3.6 to 1 was immersed 1 to 2 millimeters below the surface of the protein-lipid mixture. Sound frequencies of about 20 kilocycles per second were then generated in the mixture by means of an MSE Ultrasonic Disintegrator for 10 minutes. The portein-lipid mixture which became clear when treated in this manner remained several degrees below room temperature throughout the period of treatment. The product was recovered and characterized by electrophoresis. The results are shown in Table I.

EXAMPLE 7

A 4 milliliter volume of solution containing concentrated β-lipoprotein was put in a heat-resistant tube and then placed in an ice-water bath, it was turbid. A titanium probe 0.75 inch in diameter with an end ratio of 3.6 to 1 was immersed 1 to 2 millimeters below the surface of the turbid solution. Sound frequencies of about 20 kilocycles per second were then generated in the turbid solution by means of an MSE Ultrasonic Disintegrator for 10 minutes. The turbid solution which became even more turbid when treated in this manner remained several degrees below room temperature throughout the period of treatment. The solution resembled the appearance of chylomicrons, after treatment. This indicates that the β-lipoprotein when treated in this manner in the absence of either albumin or γ-globulin became disintegrated into its component lipid and protein parts.

The products of Examples 1 to 6 were characterized in the following manner.

(A) Electrophoretic behavior

Small samples of the protein solution before and after exposure to ultrasound were separated electrophoretically on cellulose acetate and stained with Ponceau S. Evaluation of the patterns disclosed treatment with ultrasonic vibration changed the mobility of a portion of each of the albumin and γ-globulin fractions. For example, ultrasonic treatment of a 6.25 gram percent solution of albumin caused 16.4 percent of the protein to migrate to a zone adjacent to and towards the cathodal side of the regular albumin zone. Similar treatment of an 0.7 gram percent solution of γ-globulin resulted in the migration of about 35 percent of the protein to a zone adjacent to and on the anodal side of the regular γ-globulin zone. The results of the electrophoretic analysis are shown in Table I.

TABLE II

| Sample: | Protein Content (gm. percent) | |
| --- | --- | --- |
|  | Prior to Treatment | After Treatment |
| A | 1.10 | 2.81 |
| B | 1.51 | 2.66 |
| C | 1.60 | 3.02 |
| D | 1.46 | 2.66 |
| E | 2.13 | 3.46 |
| F | 0.85 | 1.72 |
| G | 1.33 | 2.26 |
| H | 0.86 | 3.17 |

These data demonstrate that the protein content of the γ-globulin fraction is increased by ultrasonic treatment.

TABLE I.—ULTRASONIC TREATMENT FOR 10 MINUTES WITH 18–20 KILOCYCLES/SECOND

| Material Treated | Material at Normal Peak (percent) | Material at Displaced Peak (percent) | Relative Position of Displacement |
| --- | --- | --- | --- |
| Albumin | 83.6 | 16.4 | Cathodal to albumin zone. |
| γ-Globulin | 65.5 | 34.5 | Anodal to γ-globulin zone. |
| Albumin+γ-globulin | [1] 47.5 / [2] 20.5 | 32.0 | Do. |
| Albumin+β-lipoprotein | 74.5 | 25.5 | Cathodal to albumin zone. |
| γ-Globulin+β-lipoprotein | 60 | 39.2 | Anodal to γ-globulin zone. |
| Albumin+γ-globulin+β-lipoprotein | [1] 44.0 / [2] 19.0 | 37 | Do. |

[1] Albumin zone.
[2] γ-Globulin zone.

As can be seen from the data, when the serum albumin fraction is exposed to ultrasonic radiation for 10 minutes, using sound frequencies of 18–20 kilocycles/second, the serum albumin is modified so that about 16.4% of the molecules are less mobile electrophoretically, i.e, do not migrate toward the anode as rapidly as unaltered albumin when exposed to electrophoresis. Thus, two peaks are formed. The serum γ-globulin fraction is modified upon exposure to the same ultrasonic treatment so that about 34.5% of the material migrates faster toward the anode than untreated serum γ-globulin, thus two peaks are formed. A mixture of serum albumin and serum γ-globulin fractions is shown to be modified by ultrasonic treatment to have electrophoretic peaks in the γ-globulin zone, the albumin zone, and one in which about 32% of the material present is on the anodal side of the γ-globulin zone. Thus, three peaks are formed by the treated mixture. This indicates that a complex between albumin and γ-globulin is formed with electrophoretic properties similar to ultrasonically treated serum γ-globulin.

The data further indicate that when β-lipoprotein is mixed with either serum albumin, serum γ-globulin or a mixture thereof and then treated ultrasonically, electrophoretic patterns similar to the treated protein without β-lipoprotein is formed except the modified portion is somewhat larger.

This indicates that the β-lipoprotein has become coated with the protein fractions as a result of ultrasonic treatment.

The fact that the β-lipoprotein mixtures become less turbid upon treatment with ultrasonic radiation indicates that the modified material is more water soluble than the unmodified material.

In order to determine the character of the modification of the various fractions of the serum, whole serum was subjected to ultrasonic radiation of 18–20 kilocycles/second for 10 minutes. The γ-globulin was then precipitated from the serum by the addition of an electrolyte. The amount of γ-globulin precipitate was compared to the amount precipitated from an untreated sample of the same serum. The results are indicated in the following table.

The increase is due to the complexing of other proteins in the serum, e.g., albumin, with the γ-globulin fraction.

In order to ascertain the effect of ultrasonic treatment on the lipid content of the serum as related to the γ-globulin fractions, the cholesterol present in the γ-globulin fraction was measured before and after ultrasonic treatment. The results are shown in Table III.

TABLE III

| Sample: | γ-Globulin cholesterol level (mg. percent) | |
| --- | --- | --- |
|  | Before Treatment | After Treatment |
| A | 13 | 140 |
| B | 44 | 198 |
| C | 26 | 248 |
| D | 24 | 182 |
| E | 19 | 184 |
| F | 21 | 112 |
| G | 18 | 110 |
| H | 16 | 402 |

The large increase of cholesterol in the treated fraction indicates that a complexed lipid γ-globulin protein material is formed as a result of exposure of a mixture of serum γ-globulin and lipids or β-lipoproteins to ultrasonic radiation.

The data in Tables I, II and III indicate that the individual fractions of blood serum, i.e., albumin and γ-globulin are modified and altered by ultrasonic radiation and also react with each other to form a complex protein as a result of exposure to ultrasonic radiation.

The data further indicate that complexes are formed between lipid materials in blood serum and protein, e.g., γ-globulin and/or albumin materials as a result of ultrasonic treatment.

Ultrasonic treatment of blood serum containing γ-globulin and albumin results in a complex forming which has been shown by electrophoresis to increase the γ-globulin fraction and decrease the albumin fraction with the γ-globulin fraction containing the modified material.

The total protein remains constant but the ratio of albumin to total-globulin is changed. This was measured by the technique of precipitating the total-globulin fraction from treated and untreated serum containing albumin and total-globulin and comparing the results which are shown in Table IV.

TABLE IV

| Sample: | Albumin Level (gm. percent) | | Globulin Level (gm. percent) | | Albumin/Globulin Ratio | |
|---|---|---|---|---|---|---|
| | Before Treatment | After Treatment | Before Treatment | After Treatment | Before Treatment | After Treatment |
| A | 3.7 | 3.5 | 4.0 | 4.2 | 0.93 | 0.83 |
| B | 4.5 | 4.0 | 5.4 | 5.9 | 0.83 | 0.68 |
| C | 5.1 | 4.5 | 5.0 | 5.6 | 1.02 | 0.80 |
| D | 4.7 | 4.0 | 4.8 | 5.5 | 0.98 | 0.73 |
| E | 3.9 | 3.6 | 5.3 | 5.6 | 0.74 | 0.64 |
| F | 3.4 | 3.3 | 2.8 | 2.9 | 1.21 | 1.14 |
| G | 4.3 | 4.0 | 4.0 | 4.3 | 1.08 | 0.93 |
| H | 3.6 | 2.5 | 1.9 | 3.0 | 1.89 | 0.83 |

The data in Table IV indicate that there is a shift in the relative amounts of albumin and total-globulin which occurs after treatment of a mixture with ultrasonic radiation. This is apparently the result of the formation of an albumin-$\gamma$-globulin complex which retains characteristics reminiscent of $\gamma$-globulin.

The following examples teach various methods of modifying properties of blood serum by modifying proteins of the serum according to the process of this invention.

EXAMPLE 8

Antiserum against human serum $\beta$-lipoprotein was exposed to ultrasonic frequencies of 18–20 kilocycles/second by means of a MSE disintegrator. The time of treatment of various aliquots of the antiserum varied between 0 and 60 minutes. In order to determine the effect of ultrasonic treatment on the effective titer of the antiserum, it was mixed with human serum to cause $\beta$-lipoprotein to precipitate. The change in the level of $\beta$-lipoprotein which precipitates from the serum is a measure of the alteration of the titer of the antiserum.

Table V indicates the results when human serum was treated with ultrasonically modified antiserum.

TABLE V

| Ultrasonic treatment of antiserum, minutes: | $\beta$-Lipoprotein immunoprecipitate level (mm.) |
|---|---|
| 0 | 6.4 |
| 5 | 7.0 |
| 10 | 7.1 |
| 15 | 7.5 |
| 20 | 7.6 |
| 25 | 7.6 |
| 30 | 6.9 |
| 35 | 7.3 |
| 40 | 10.8 |
| 45 | 9.0 |
| 60 | 5.4 |

The data in Table V indicate that the titer of the antiserum varies and is related to the length of time of ultrasonic treatment. The maximum effect is noted with antiserum treated for 40 minutes.

Immunoelectrophoretic patterns prepared using anti-$\gamma$-globulin serum indicates that as the length of time that the antiserum was subjected to ultrasonic radiation was increased, a $\beta$-fraction appeared to be broken down into products that tended to migrate toward the cathode, giving the appearance of blanketing the $\gamma$-globulin fraction. This is coupled with a diminished reactivity of the antiserum toward its antigen. It is theorized that a fraction is being released during ultrasonic treatment and the fragments are binding with $\gamma$-globulin, thereby altering its immuno reactivity.

Ultrasonic radiation is capable of altering the antigenic properties of blood serum. This is evidenced by the fact that the $\beta$-lipoprotein precipitate obtained from sera exposed to ultrasonic radiations for increasing times and measured at one-minute intervals, first increases then decreases as the time is extended. This suggests that the effective concentration of reactive $\beta$-lipoprotein antigen was initially increased and then decreased as the ultrasonic treatment was continued.

Exposure of albumin and lipid to ultrasonic radiation for 10 minutes forms a complex that is more readily acted upon by the lipase present in serum or other body fluids. For example, a mixture of 3 ml. olive oil, 1 ml. buffer, 2.5 ml. deoxycholate and 1 ml. albumin were tested before and after exposure to ultrasonic radiation with body fluid containing lipase. A total of 45.6 units of activity were noted with untreated mixture, whereas that exposed to ultrasonic radiation for 10 minutes prior to testing yielded 160.8 units of activity. This method of increasing the reactivity of the lipid substrate is valuable for producing a test material for measuring lipase.

I claim:
1. A method of modifying the structure of isolated serum albumin which comprises subjecting said albumin to ultrasonic radiation equivalent to from about 18 to about 20 kilocycles per second for at least about 10 minutes.

2. A method of modifying the structure of isolated serum $\gamma$-globulin which comprises subjecting said $\gamma$-globulin to ultrasonic radiation equivalent to from about 18 to about 20 kilocycles per second for at least about 10 minutes.

3. A method of forming a complex albumin-$\gamma$-globulin protein structure which comprises subjecting a mixture of isolated serum albumin and isolated serum $\gamma$-globulin to ultrasonic radiation equivalent to from about 18 to about 20 kilocycles per second for at least about 10 minutes.

4. A method of solubilizing lipid materials in aqueous media which comprises subjecting an isolated mixture of serum albumin and $\beta$-lipoprotein or lipids to ultrasonic radiation equivalent to from about 18 to about 20 kilocycles per second for at least about 10 minutes.

5. A method of forming a water soluble solution containing lipid materials which comprises subjecting an isolated mixture of serium $\gamma$-globulin and $\beta$-lipoprotein or lipids to ultrasonic radiation equivalent to from about 18 to about 20 kilocycles per second for at least about 10 minutes.

6. A method of forming a water soluble solution containing lipid materials which comprises subjecting an isolated mixture of serum albumin, serum $\gamma$-globulin and $\beta$-lipoprotein or lipids to ultrasonic radiation equivalent to from about 18 to about 20 kilocycles per second for at least about 10 minutes.

7. A complex protein formed by subjecting a mixture of isolated serum albumin and isolated serum $\gamma$-globulin to ultrasonic radiation equivalent to from about 18 to about 20 kilocycles per second for at least about 10 minutes.

8. A complex lipid-containing protein formed by subjecting an isolated mixture of serum albumin and $\beta$-lipoprotein or a lipid to ultrasonic radiation equivalent to from about 18 to about 20 kilocycles per second for at least about 10 minutes.

9. A complex lipid-containing protein formed by subjecting an isolated mixture of serum $\gamma$-globulin and $\beta$-lipoprotein or a liquid to ultrasonic radiation equivalent to from about 18 to about 20 kilocycles per second for at least about 10 minutes.

10. A complex lipid-containing protein formed by subjecting an isolated mixture of serum albumin, serum $\gamma$-globulin and $\beta$-lipoprotein or a lipid to ultrasonic radiation equivalent to from about 18 to about 20 kilocycles per second for at least about 10 minutes.

11. A method of producing a complex which is readily acted upon by serum lipase which comprises ultrasonically treating with an equivalent of about 18 to about 20 kilocycles per second for at least about 10 minutes an isolated mixture of lipid and serum albumin.

12. A lipid-albumin complex suitable for reactivity with serum lipase, formed by subjecting an isolated lipid-serum albumin mixture to ultrasonic radiation equivalent to from about 18 to about 20 kilocycles per second for at least about 10 minutes.

References Cited

M. I. Ravich—Scherbo et al., Effect of Ultrasound-Treated Homologous Blood Serum on Antibody Synthesis in In Vivo Expts., from Chemical Abstracts, vol. 65, 1966, p. 19135.

Radino—Soroprotein Variations from Ultrasonic Irradiation, from Chemical Abstracts, vol. 51, p. 1324.

Lapinskaya et al.—Effect of Ultrasonic Waves Upon Albumin and Amino Acids; published by The National Science Foundation, pp 1–7, 1954.

SAMUEL H. BLECH, Primary Examiner

RICHARD B. TURER, Assistant Examiner

U.S. Cl. X.R.

195—1.7, 100; 260—112, 121; 424—177